Figure 1:
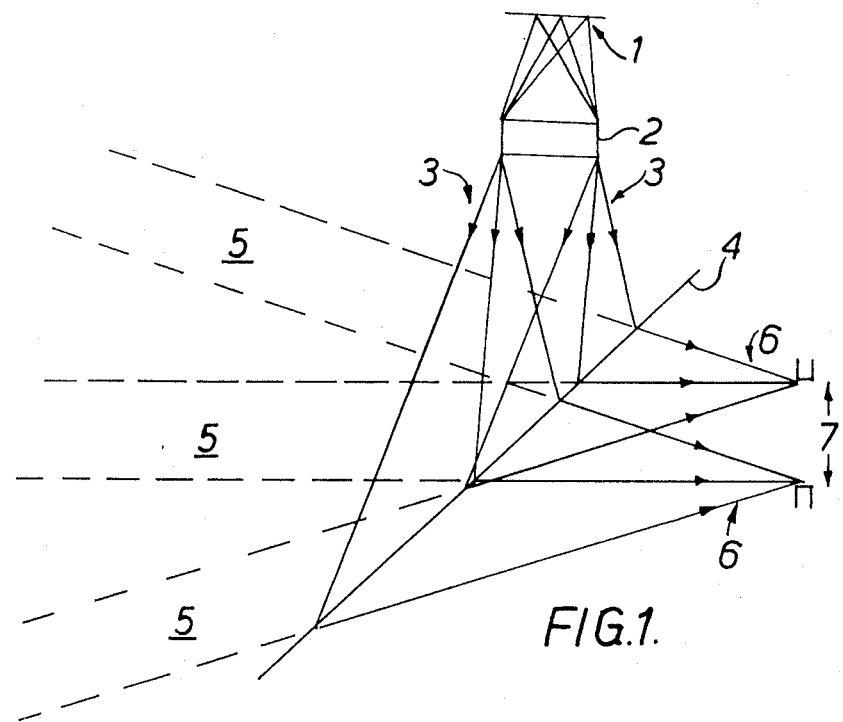

United States Patent
Freeman

[11] 3,814,508
[45] June 4, 1974

[54] OPTICAL SYSTEMS

[75] Inventor: Michael Harold Freeman, Denbigh, Wales

[73] Assignee: Pilkington P.E. Limited, London, England

[22] Filed: July 31, 1972

[21] Appl. No.: 276,319

[30] Foreign Application Priority Data
Aug. 3, 1971   Great Britain.................. 36380/71

[52] U.S. Cl................ 350/299, 350/202, 350/292, 350/286, 350/288
[51] Int. Cl. .......................................... G02b 5/08
[58] Field of Search ....... 350/97, 96, 102, 103, 286, 350/287, 288, 202, 292, 299

[56] References Cited
UNITED STATES PATENTS

| | | | |
|---|---|---|---|
| 2,452,822 | 11/1948 | Wolf................................... | 350/102 |
| 3,215,039 | 11/1965 | Gill, Jr................................. | 350/97 |
| 3,382,023 | 5/1968 | Van Horn, Jr...................... | 350/286 |
| 3,469,898 | 9/1969 | Altman............................... | 350/103 |
| 3,472,574 | 10/1969 | Kuhn .................................. | 350/287 |
| 3,536,558 | 10/1970 | Lipkins............................ | 350/96 OT |
| 3,575,773 | 4/1971 | Courtot.............................. | 350/97 |

Primary Examiner—Ronald L. Wibert
Assistant Examiner—Michael J. Tokar
Attorney, Agent, or Firm—Mattern, Ware and Davis

[57] ABSTRACT

This invention provides an optical system for displaying visual information. The system has a main plane towards which light is projected, and from which the light travels in a different direction. The system is comprised of reflecting surfaces which are provided in the region of the main plane. Each surface is orthogonal to the main plane and each of the surfaces is orthogonal to an adjacent surface. Thus incident light, by successive reflections, is directed away from the main plane in a direction exactly 180° opposite to that in which it would travel if a mirror were to be located in the main plane.

18 Claims, 7 Drawing Figures

OPTICAL SYSTEMS

This invention relates to optical systems, and more particularly to optical systems for displaying visual information.

A display system serves to present to an observer a representation of a scene or some other form of visual information. The information content of the representation increases as the resolution is increased, until it surpasses that of the human eye, and also as the field of view increases, until it covers a complete sphere or the maximum usable portion of a sphere. In practice, such maximum usable portion is often determined by glazing areas in a vehicle or other control area. It is a common requirement for display systems that the representation should appear at a location distant from the observer, i.e. that light reaching the observer's eyes should be collimated or near-collimated. Generally, however, systems which provide such collimated viewing can be adjusted to direct light to the observer as if from near objects, and are therefore more properly considered as 'virtual image' systems normally capable of providing, in particular, collimated viewing whereby the virtual image appears at infinity.

When there is a requirement for a 'virtual image' system having a wide field, but with a limitation on how near to the observer's eyes the optics can be situated, a problem arises. With, for example, binocular eyepieces it is feasible to provide a field of view of 70° or more since with a typical exit pupil of about 15 mm. and a typical eye to optics distance of about 15 mm., it can be shown that the required aperture size of conventional optics is about 31 mm. Optics of this size can be manufactured without great difficulty. If, however, a system is required to give a 70° field of view with an exit pupil of 8 ins. and an optics to observer distance of at least 24 ins. (e.g. to permit the observer to move his head and operate controls without undue restraint on his head position), then the aperture size of the optics becomes, on the same basis, about 42 ins. Well corrected optics of this size are difficult and expensive to manufacture.

The above mentioned problem arises basically because collimated beams of light must be made to converge on the exit pupil. With projection systems for cinema audiences, wide-angle projection can readily be achieved as the light diverges from the projection lens, the screen then serving to reflect the light with a degree of scatter and reflex action to provide converging light for the audience. However, the screen can only effect this action for real images projected on to it.

It is an object of the present invention to provide an optical system capable of converting projected diverging light into converging light and which can provide a wide angle field of view without the need for formation of a real image.

According to the present invention there is provided an optical system having a predetermined plane towards which incident light is projected and from which light travels in a different direction to the direction of incidence, the system comprising a multiplicity of reflecting surfaces disposed in the region of said plane, each surface being in substantially orthogonal relationship to said plane, and each one of said surfaces having a substantially orthogonal relationship with a closely adjacent surface, so that incident light can, by successive reflections of each ray from two substantially orthogonal surfaces, travel away from said plane in a direction opposite to that in which it would travel if a mirror were located with its reflecting surface in said plane.

With such a system diverging light projected towards said plane can be converted into converging light travelling away from said plane. In particular, projected diverging beams of collimated light can be converted into converging beams of collimated light, so that an observer positioned to receive the latter can see a virtual image, which appears at infinity, of visual information carried by the projected light.

Said reflecting surfaces may be plane surfaces. Thus, they may be provided by two sets of plane mirrors, the mirrors in each set being in parallel closely spaced (e.g. a spacing of the order of 1 mm.) relationship, and being in orthogonal relationship to the mirrors of the other set, each mirror of one set being closely adjacent a mirror of the other set. The mirrors in the two sets may be confined between the same two planes parallel to said predetermined plane, or the mirrors in one set may be confined between one pair of planes and the mirrors of the other set may be confined between another pair of planes, one of which may be common to both pairs and may conveniently be said predetermined plane. Said surfaces may be provided by faces of elements of square cross-section (e.g. having a side dimension of the order of 1 mm.), the elements being arranged in side-by-side array. Such elements may be hollow, internal faces thereof then providing said surfaces, or may be solid transparent elements having a reflective coating on at least two adjacent side faces.

Alternatively, said reflecting surfaces may have a limited curvature. In particular the surfaces may be provided by two sets of spiral elements, the spirals of one set winding in the opposite sense to the spirals of the other set from a common origin, and being of complementary angle to the spirals of the other set so that where a spiral of one set intersects or crosses a spiral of the other set, the reflecting surfaces provided thereby are in substantially orthogonal relationship. Preferably the spirals of the two sets have the same 45° angle, but they may have different complementary angles, for example 30° and 60°. Preferably said common origin coincides with the point where the incident light would strike said predetermined plane at a normal, and the width of each spiral element, i.e. the width of the reflecting surface provided thereby, is gradually increased from the origin outwards, i.e. the width is a maximum at the end remote from the origin and a minimum at the end at or nearest the origin. The spiral elements may be confined between the same two planes parallel to said predetermined plane, or the spiral elements in one set may be confined between one pair of planes and the spiral elements of the other set may be confined between another pair of planes, one of which may be common to both pairs and may conveniently be said predetermined plane.

Figure 2:
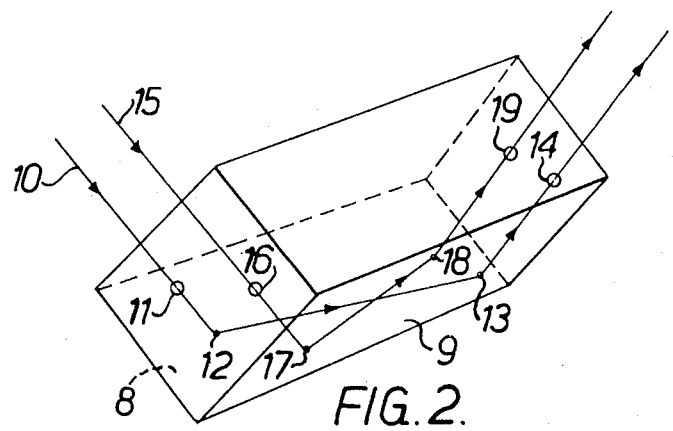
Figure 3:
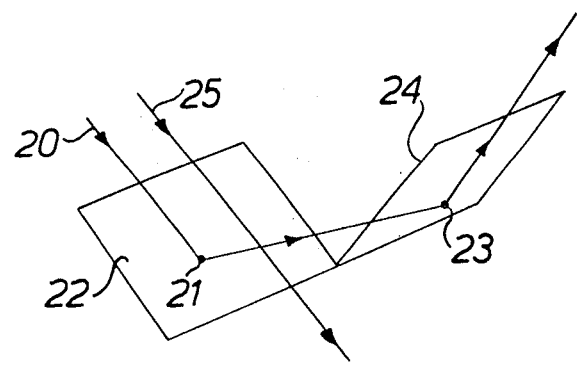
Figure 4:
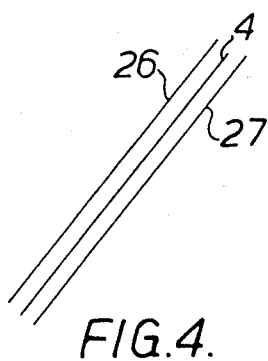
Figure 5:
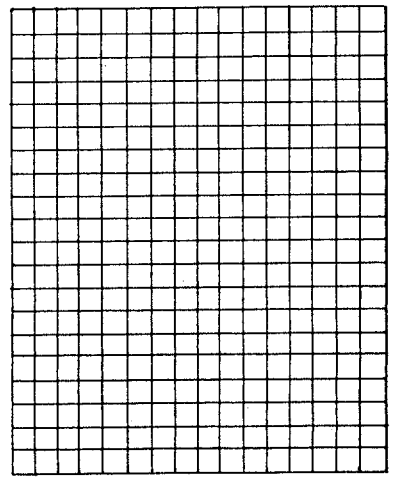
Figure 6:
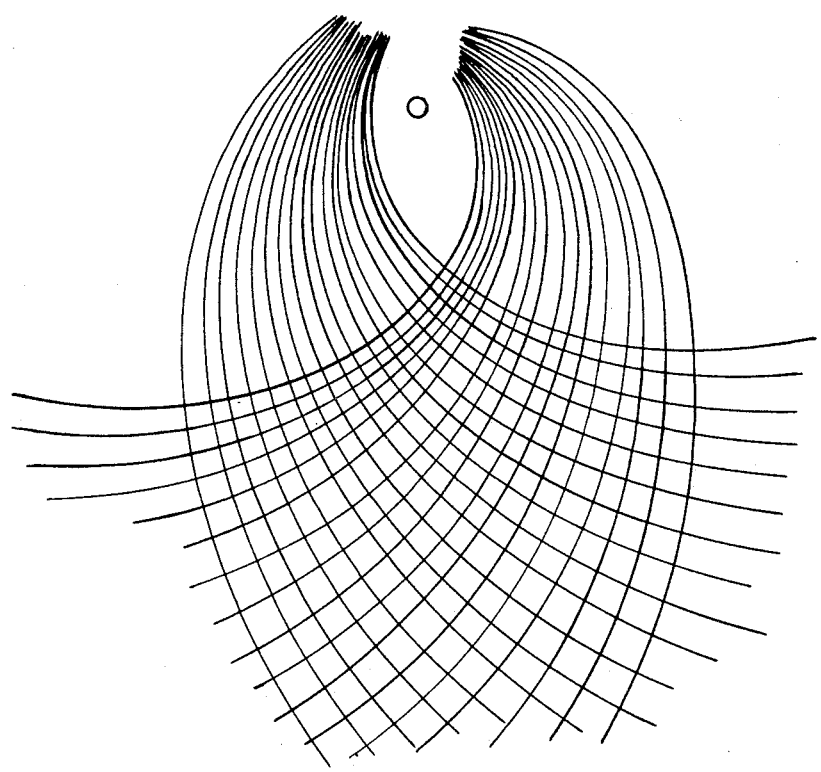
Figure 7:
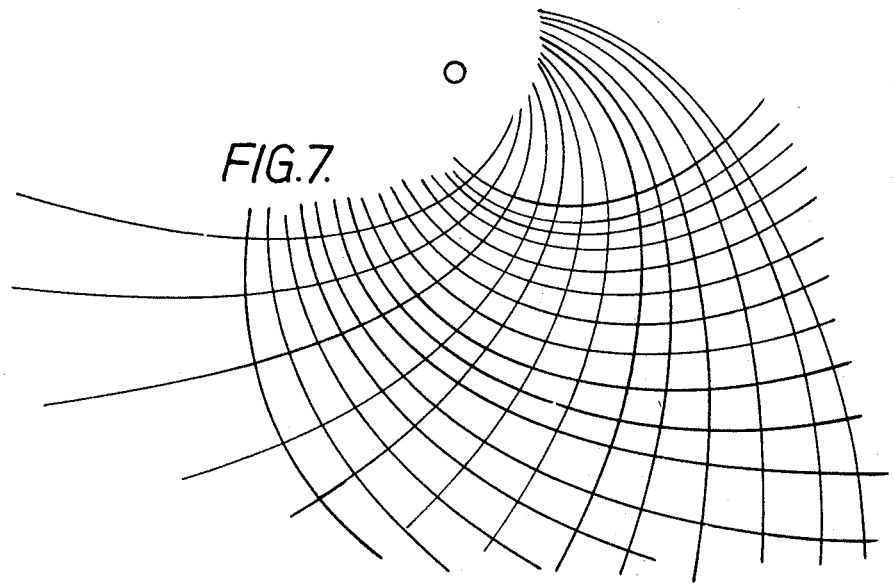

In order that the invention may be better understood, reference will now be made to the accompanying drawings, which are provided solely by way of illustration and example, and in which:

FIG. 1 is a schematic representation of an optical system illustrating the principle of the invention, FIG. 2 is a schematic perspective view of an element for use in an optical system in accordance with the invention, FIG. 3 is a schematic perspective view of elements for use in an optical system in accordance with the invention, FIG. 4 is a diagrammatic representation illustrating a feature of a system in accordance with the invention, and FIGS. 5, 6 and 7 are diagrammatic representations of systems in accordance with the invention.

FIG. 1 shows an object 1 situated in the focal plane of a projection lens 2 so that light from the object emerges from the lens as diverging beams of collimated light 3. If an ordinary mirror were disposed with its reflecting surface in a predetermined plane 4, the beams of light 3 would be reflected as diverging beams of collimated light 5, which would appear to come from an exit pupil 7. In accordance with the present invention means are provided in the region of the plane 4 to reflect the light 3 in the reverse fashion to an ordinary mirror so as to form beams of collimated light 6 which travel in the opposite direction to the beams of light 5 and which thus converge to actually pass through the exit pupil 7. An observer having his eyes located within the exit pupil 7 can then receive the collimated light 6 as if it were coming from a distant wide-angle object, and can thereby see an image of the object 1 which appears at a distant location, theoretically infinity.

The effect of the reverse-action reflection means can be explained as follows. There are two planes orthogonal to the predetermined plane 4 and orthogonal to each other. Reflecting surfaces placed in all three of these planes would act in the manner of a corner-cube reflector to return light in the opposite direction and parallel to its incident path if the light is reflected once by each of the three reflecting surfaces. The order in which the light strikes the three reflecting surfaces is immaterial to the resultant returning beam. However, considering the specific case where the light strikes the surface in the plane 4 last of the three reflections, immediately prior to this third reflection the light is travelling in the opposite direction to collimated light 5 so that after the third reflection it travels in the opposite direction to the incident collimated light 3. Thus, if the reflecting surface in the plane 4 is removed, the light emerges, after reflection from the other two surfaces, as collimated light 6 travelling towards the exit pupil 7. Therefore, by providing two reflecting surfaces orthogonal to the plane 4 and orthogonal to each other, the required reverse-action reflection can be achieved.

In the above explanation reference is made to the ability of a corner-cube reflector to return light parallel to its incident direction. Normally each returning ray is laterally shifted with respect to its incident ray by an amount equivalent to twice the incident ray's lateral displacement from the corner-cube apex, so that only light impinging precisely on the apex is returned coincident with the path of its incident ray. This lateral shift can mean that a ray entering the corner-cube fails to be returned in the opposite direction because the finite size of the reflecting surfaces does not allow all three reflections to take place. This applies particularly to oblique rays and can result in a shadowing effect in the light returned from an individual corner-cube reflector. Although the reverse-action reflection described above utilises only two reflecting surfaces, as against a corner-cube's three reflecting surfaces, similar lateral ray shift and resultant shadowing can occur. However, these effects can be satisfactorily accommodated with arrangements of the form described by way of example below.

The reverse-action reflection means is confined between two planes located close to and parallel with the predetermined plane 4. The separation between these confining planes may, for example, be about 1.00 mm. Between these planes is provided, in effect, a multiplicity of pairs of orthogonal reflecting surfaces, each orthogonal to the plane 4, arranged in an array. Thus there may be provided, in effect, a first multiplicity of parallel reflecting surfaces, and a second multiplicity of parallel reflecting surfaces orthogonal to the surfaces of said first multiplicity, the surfaces thus being arranged in boxed formation as schematically illustrated in FIG. 5. The spacing between parallel surfaces may be about 1.00 mm.

Conveniently this form of array can be provided by elements of square cross-section arranged side by side. FIG. 2 illustrates one such element. The element shown in FIG. 2 is solid and of transparent material, but has at least two adjacent side faces, indicated as 8 and 9, provided with a reflective coating. In practice all four side faces may have a reflective coating. An array of such elements may, for example, be produced by making glass fibres of the required square cross-section (e.g. of about 1.00 mm. dimension), applying a reflective coating to two (or all) of the fibre faces, and arranging the fibres in an array in the same fashion as a fibre-optic face plate. A further method of producing an array of such elements comprises forming a stack of sheets of suitable material and thickness (e.g. about 1.00 mm.) each sheet having a reflective coating on one major surface, slicing through the stack to produce a composite sheet having a multiplicity of reflecting surfaces orthogonal to the plane of the slice, the slice thickness being substantially the same as the initial sheet thickness, providing such composite sheets with a reflective coating on one face, stacking the coated composite sheets together, and slicing therethrough to give an array of the required thickness.

FIG. 2 illustrates the paths of light rays through each square cross-section element. One illustrative incident ray 10 enters through the front end face as indicated at 11, is first reflected from the face 8 as indicated at 12, is then reflected from the face 9 as indicated at 13, and emerges through the rear end face as indicated at 14. Another illustrative incident ray 15 enters through the front end face as indicated at 16, is first reflected from the face 9 as indicated at 17, is then reflected from the face 8 as indicated at 18, and emerges through the rear end face as indicated at 19.

In place of the solid element shown in FIG. 2, the array may comprise hollow tube-like elements of square cross-section.

The reverse-action reflection can also be effected by an arrangement schematically shown in FIG. 3 wherein a pair of orthogonal reflecting surfaces is located to reflect incident rays like the ray 10 of FIG. 2, but to permit incident rays like the ray 15 of FIG. 2 to pass to another pair of orthogonal reflecting surfaces (or, conversely, to reflect rays like the ray 15 but permit rays like the ray 10 to pass to another pair of surfaces). Thus, FIG. 3 shows an incident ray 20 (corresponding to the ray 10 of FIG. 2) which is reflected as indicated at 21 from a surface 22, and is then reflected as indicated at 23 from an orthogonal surface 24. A ray 25 (corresponding to the ray 15 of FIG. 2) travels past the surfaces 22 and 24 to be reflected by another pair of orthogonal surfaces in the array.

It can therefore be seen from FIG. 3 that the reverse-action reflection means may comprise one set of parallel reflecting surfaces confined between one pair of planes (parallel to the plane 4 of FIG. 1) and another set of parallel reflecting surfaces, orthogonal to those of said one set, confined between another pair of planes. Preferably the two pairs of planes have a common plane which conveniently is the predetermined plane 4. This is diagrammatically illustrated in FIG. 4 which shows two planes 26 and 27 parallel to, and one on each side of the plane 4. A first multiplicity of parallel reflecting surfaces may be confined between the planes 26 and 4, and a second multiplicity of parallel reflecting surfaces, orthogonal to those of said first multiplicity, may be confined between the planes 4 and 27, the reflecting surfaces in each multiplicity being orthogonal to the planes 26, 4 and 27. The reflecting surfaces may conveniently be provided by plane strip-like mirrors, there being one parallel set of mirrors between the planes 26 and 4 and another parallel set of mirrors, orthogonal to those of the first set, between the planes 4 and 27, so that, when viewed normally to said planes a boxed array as illustrated in FIG. 5 is seen but in which one set of mirrors is, in fact, behind the other.

For theoretical maximum use of incident light each pair of orthogonal reflecting surfaces should be at 45° to the incident light, although the reverse-action reflection effect can be satisfactorily achieved with other angles. However, by curving the surfaces to a limited extent dependent on the resolution of the system, the surfaces can be caused to present substantially a 45° angle over a wide field. As a particular example, the surfaces may be provided by spiral elements, there being two sets of spirals of 45° angle, i.e. the angle between the radius and the tangent at any point on the spiral, from a common origin, the spirals of one set winding in the opposite sense to the spirals in the other set. With this arrangement, which is diagrammatically shown in FIG. 6, the reflecting surface on a spiral element of one set is substantially orthogonal to the reflecting surface on a spiral element of the other set at the position where the two spirals intersect or cross. The arrangement therefore provides, in effect, an array comprising a multiplicity of pairs of orthogonal reflecting surfaces, and, if the origin of the spirals coincides with the point where light from the projection lens 2 would strike the plane 4 at a normal, i.e. where the plane 4 is intersected by a normal between the observer's eyes and the projection lens 2, the orthogonal reflecting surfaces of each pair are substantially at 45° to the incident light (i.e. a line drawn from the origin to the intersection of the surfaces of a pair would bisect the right angle between them). Preferably, as previously described in relation to plane mirrors, the spiral elements of one set are confined between one pair of planes, such as the planes 26 and 4 of FIG. 4, and the spiral elements of the other set are confined between another pair of planes, such as the planes 4 and 27 of FIG. 4. Preferably also, the width of the spiral elements, i.e. the width dimension of the reflecting surface which lies normal to the plane of FIG. 6, gradually increases from a minimum at the end at or nearest the origin to a maximum at the end remote from the origin. In other words, the spiral element, if laid flat, has a generally wedge-like shape.

FIG. 7 illustrates a further spiral arrangement generally similar to that of FIG. 6 but in which the spirals of the two sets instead of having the same 45° angle have different complementary angles such as to give an orthogonal relationship where a spiral of one set intersects or crosses a spiral of the other set. For example, the spirals of one set may have a 30° angle and the spirals of the other set a 60° angle.

What I claim is:

1. An optical system having a predetermined plane towards which incident light is projected from one side of said plane and from which light travels in a different direction to the direction of incidence and away from said plane on the other side, the system comprising a multiplicity of reflecting surfaces disposed in the region of the said plane, each surface being in substantially orthogonal relationship to the plane and each one of the surfaces having a substantially orthogonal relationship with a closely adjacent one of said surfaces so that incident light can, by successive reflections of each ray from two only substantially orthogonal adjacent ones of said surfaces, travel away from the plane in a direction opposite to that in which it would travel if a mirror were located with its reflecting surface in the said plane.

2. An optical system according to claim 1 wherein the reflecting surfaces are provided by two sets of plane mirrors, the mirrors in each set being in parallel closely spaced relationship and being in orthogonal relationship to the mirrors of the other set, each mirror of one set being closely adjacent to a different one of the mirrors of the other set.

3. An optical system according to claim 2 wherein the mirrors in the two sets of mirrors are confined between the same two planes parallel to the said predetermined plane.

4. An optical system according to claim 2 wherein the mirrors in one set are confined between one pair of planes and the mirrors of the other set are confined between another pair of planes parallel to the predetermined plane.

5. An optical system according to claim 1 wherein the said reflecting surfaces are provided by faces of elements of square cross-section arranged in side-by-side array.

6. An optical system according to claim 5 wherein the said elements are hollow, the internal surfaces of the elements providing the reflecting surfaces.

7. An optical system according to claim 5 wherein the said elements are solid transparent members each having a reflective coating on at least two adjacent side faces.

8. An optical system according to claim 1 wherein the said reflecting surfaces have a limited curvature and are provided by two sets of spiral elements, the spirals of one set winding in the opposite sense to the spirals of the other set from a common origin and being of complementary angle to the spirals of the other set so that where a spiral of one set intersects a spiral of the other set the reflecting surfaces provided thereby are in substantially orthogonal relationship.

9. An optical system according to claim 8 wherein the spirals of the two sets have the same 45° angle.

10. An optical system according to claim 8 wherein the spirals of the two sets have different complementary angles.

11. An optical system according to claim 8 wherein the said common origin coincides with the point where incident light strikes the predetermined plane at the normal and the width of each spiral element is gradually increased from the origin outwards so that the width of said reflecting surfaces is at a maximum at the end remote from the origin and at a minimum at the end at or nearest to the origin.

12. An optical system according to claim 8 wherein the spiral elements are confined between the same two planes parallel to the said predetermined plane.

13. An optical system according to claim 8 wherein the spiral elements in one set are confined between one pair of planes and the spiral elements of the other set are confined between another pair of planes one of which is common to both parts and is parallel to the said predetermined plane.

14. An optical system according to claim 7 wherein said elements comprise a multiplicity of pairs of orthogonal reflecting surfaces, each orthogonal to the predetermined plane, arranged in array, the surfaces thus being arranged in boxed formation between parallel confining planes spaced apart by about 1.00mm.

15. An optical system according to claim 5 wherein all four side faces of the elements are provided with a reflective coating.

16. An optical system according to claim 5 wherein said elements are glass fibres of the required square cross-section and each comprises reflective coatings applied to two of the fibre faces.

17. An optical system according to claim 5 wherein said elements are glass fibres of the required square cross-section and each comprises reflective coatings applied to all four of the fibre faces.

18. An optical system according to claim 1 wherein the array of elements is produced by forming a stack of sheets of suitable material and thickness, each sheet having a reflective coating on one major surface, slicing the stack to produce a composite sheet having a multiplicity of reflecting surfaces orthogonal to the plane of the slice, the slice thickness being substantially the same as the initial sheet thickness, providing such composite sheets with a reflective coating on one face, stacking the coated sheets together and slicing through the stack to give an array of required thickness.

* * * * *